US008107387B2

(12) United States Patent
Ariyur et al.

(10) Patent No.: US 8,107,387 B2
(45) Date of Patent: Jan. 31, 2012

(54) METHOD TO OPERATE A WIRELESS NETWORK HAVING A PREDICTABLE AND STABLE PERFORMANCE

(75) Inventors: Kartik B. Ariyur, Minneapolis, MN (US); Yunjung Yi, St. Louis, MO (US); Srivatsan Varadarajan, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 389 days.

(21) Appl. No.: 12/054,819

(22) Filed: Mar. 25, 2008

(65) Prior Publication Data

US 2009/0245262 A1   Oct. 1, 2009

(51) Int. Cl.
*H04L 12/26* (2006.01)
(52) U.S. Cl. ........ 370/252; 370/241; 370/254; 455/423; 455/522; 455/425
(58) Field of Classification Search .................. 370/400, 370/252, 329, 331–334; 455/522, 423–425, 455/67.11, 41.2, 13.1
See application file for complete search history.

(56) References Cited

U.S. PATENT DOCUMENTS

| | | | |
|---|---|---|---|
| 5,596,722 A | 1/1997 | Rahnema |
| 5,930,684 A | 7/1999 | Keskitalo et al. |
| 6,259,927 B1 | 7/2001 | Butovitsch et al. |
| 6,442,615 B1 | 8/2002 | Nordenstam et al. |
| 6,606,303 B1 | 8/2003 | Hassel et al. |
| 6,778,839 B2 | 8/2004 | Valkealahti |
| 6,795,865 B1 | 9/2004 | Bahl et al. |
| 6,829,222 B2 | 12/2004 | Amis et al. |
| 6,836,463 B2 | 12/2004 | Garcia-Luna-Aceves et al. |
| 6,917,985 B2 | 7/2005 | Madruga et al. |
| 6,931,257 B2 | 8/2005 | Shahidi et al. |
| 6,961,310 B2 | 11/2005 | Cain |
| 6,963,747 B1 | 11/2005 | Elliott |
| 6,968,201 B1 | 11/2005 | Gandhi et al. |
| 7,016,306 B2 | 3/2006 | Alapuranen et al. |
| 7,027,402 B2 | 4/2006 | Hedden |
| 7,035,221 B2 | 4/2006 | Furukawa et al. |
| 7,085,290 B2 | 8/2006 | Cain et al. |
| 7,111,074 B2 | 9/2006 | Basturk |
| 7,159,035 B2 | 1/2007 | Garcie-Luna-Aceves et al. |
| 7,225,268 B2 | 5/2007 | Watanabe |
| 7,266,386 B2 | 9/2007 | Kim et al. |
| 7,280,483 B2 | 10/2007 | Joshi |
| 7,295,856 B2 | 11/2007 | Agin |

(Continued)

OTHER PUBLICATIONS

Varadarajan et al., "Analytic Framework and QOS Adaptive Mechanisms for Achieving Transport Capacity Bounds in Multi-Hop Statically Routed IE", "First Annual Conference of ITA (ACITA)", 2007, Publisher: Honeywell Aerospace Advanced Technology Labs, Published in: Minneapolis, MN.

*Primary Examiner* — Hassan Phillips
*Assistant Examiner* — Anez Ebrahim
(74) *Attorney, Agent, or Firm* — Fogg & Powers LLC

(57) ABSTRACT

A method for operating a wireless network having a predicable and stable network performance. The method includes controlling output distribution of nodes in the network to adapt to traffic changes in the network, distributing power control to adapt to environmental changes in the network, and providing traffic sensitive routing to adapt to topology changes in the network. The method also includes converging to set points based on the controlling of output distribution, the distributing of power control, and the providing of traffic sensitive routing.

16 Claims, 11 Drawing Sheets

U.S. PATENT DOCUMENTS

| | | |
|---|---|---|
| 7,333,827 B2 | 2/2008 | Biddiscombe et al. |
| 7,339,994 B2 | 3/2008 | Lin et al. |
| 7,340,268 B2 | 3/2008 | Oh et al. |
| 7,342,907 B2 | 3/2008 | Kim et al. |
| 2002/0105937 A1* | 8/2002 | Takeuchi et al. ............. 370/345 |
| 2002/0173309 A1 | 11/2002 | Shahidi et al. |
| 2002/0196802 A1* | 12/2002 | Sakov et al. ................. 370/432 |
| 2003/0033350 A1* | 2/2003 | Arimilli et al. ............... 709/202 |
| 2003/0045318 A1* | 3/2003 | Subrahmanya ............... 455/522 |
| 2003/0163554 A1* | 8/2003 | Sendrowicz .................. 709/220 |
| 2004/0052210 A1* | 3/2004 | Kasera et al. ................. 370/235 |
| 2004/0073701 A1 | 4/2004 | Huang et al. |
| 2004/0142692 A1 | 7/2004 | Schwarz et al. |
| 2004/0146007 A1* | 7/2004 | Saadawi et al. .............. 370/238 |
| 2005/0050220 A1* | 3/2005 | Rouyer et al. ................ 709/232 |
| 2005/0053005 A1 | 3/2005 | Cain et al. |
| 2005/0136961 A1 | 6/2005 | Simonsson et al. |
| 2005/0143012 A1 | 6/2005 | Gu et al. |
| 2005/0176455 A1 | 8/2005 | Krishnan et al. |
| 2006/0040696 A1 | 2/2006 | Lin |
| 2006/0092855 A1 | 5/2006 | Chiu |
| 2006/0092870 A1 | 5/2006 | Kondou et al. |
| 2006/0160555 A1* | 7/2006 | Kobayashi et al. ........... 455/522 |
| 2006/0183495 A1 | 8/2006 | Soliman |
| 2006/0268787 A1 | 11/2006 | Strutt et al. |
| 2007/0133483 A1 | 6/2007 | Lee et al. |
| 2007/0149204 A1 | 6/2007 | Redi et al. |
| 2009/0069057 A1* | 3/2009 | Haartsen et al. ............. 455/574 |

* cited by examiner

METHOD TO OPERATE A WIRELESS NETWORK HAVING A PREDICTABLE AND STABLE PERFORMANCE

CROSS REFERENCE TO RELATED APPLICATIONS

This application is related to: U.S. patent application Ser. No. 11/868,804 having a title of "METHOD AND SYSTEM FOR PERFORMING DISTRIBUTED OUTER LOOP POWER CONTROL IN WIRELESS COMMUNICATION NETWORKS" (also referred to here as the "Ser. No. 11/868, 804 Application") filed on Oct. 8, 2007; U.S. patent application Ser. No. 11/841,364 having a title of "METHOD FOR ADJUSTING POWER AT A NODE" (also referred to here as the "Ser. No. 11/841,364 Application"), filed on Aug. 20, 2007; U.S. patent application Ser. No. 11/269,383) having a title of "A SYSTEM AND METHOD TO PERFORM STABLE DISTRIBUTED POWER CONTROL IN A WIRELESS NETWORK" (also referred to here as the "Ser. No. 11/269,383 Application"), filed on Nov. 8, 2005; and U.S. patent application Ser. No. 11/857,748 having a title of "METHOD AND SYSTEM FOR OPTIMIZING WIRELESS NETWORKS THROUGH FEEDBACK AND ADAPTION" (also referred to here as the "Ser. No. 11/857,748 Application"), filed on Sep. 19, 2007. The Ser. No. 11/868, 804 application, the Ser. No. 11/841,364 application, the Ser. No. 11/269,383 application, and the Ser. No. 11/857,748 application are hereby incorporated herein by reference.

BACKGROUND

Wireless networks need to provide a Quality of Service (QoS) guaranteed for applications. Resource-reservation-protocol (RSVP)-like call-admission control is necessary for managing application QoS requirements and for mapping the application to network resources. Because of unpredictable available bandwidth and unstable routes, direct resource reservation protocol (RSVP) is not feasible. Wireless networks need to provide mechanisms for providing network transport guarantees and maintaining QoS. Stable guarantees are not available due to the inherent dynamics of the network. The inherent dynamics of the network include route and/or link changes as a result of environment and ad-hoc mobility.

Wireless networks are generally synthesized for optimal performance for specific criteria under specific circumstances. This optimization can degrade network performance in an unpredictable manner so that a node or system user is disconnected when the operating conditions of the network change.

SUMMARY

A first aspect disclosed herein is a method for operating a wireless network having a predicable and stable network performance. The method includes controlling output distribution of nodes in the network to adapt to traffic changes in the network, distributing power control to adapt to environmental changes in the network, and providing traffic sensitive routing to adapt to topology changes in the network. The method also includes converging to set points based on the controlling of output distribution, the distributing of power control, and the providing of traffic sensitive routing. This summary is not intended to describe all the embodiments of the present application. It is merely provided as an example of an embodiment and does not limit any claimed embodiment in any manner.

DRAWINGS

In accordance with common practice, the various described features are not drawn to scale but are drawn to emphasize features relevant to the present invention. Like reference characters denote like elements throughout the figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

A wireless network of the invention is provided with a set of protocols to enable predictable and stable network performance. The protocols provide the needed guarantee of quality of service (QoS) for applications and provide the mechanisms for providing network transport guarantees while maintaining quality of service. The protocols control output distribution at each communication link in the network to ensure predictable available bandwidth while providing stable paths/links in the face of mobility so that disturbances to the network are rejected. The terms "path" and "route" are interchangeable as used herein.

A three-prong approach of a disturbance rejection protocol framework according to the invention includes:

1) adaptation to traffic changes through output distribution control of each node in the network;
2) adaptation to environment changes through distributed power control of each node in the network; and
3) adaptation to changes in the topology of the network through traffic sensitive routing and robust group routing/controlled flooding. As used herein, the "topology of the network" is the number of nodes in the network and the configurations of the communication links between the nodes in the network.

For unsaturated networks at least, this framework provides the latencies and end-to-end throughput guarantee for different varieties of traffic. Traditional adaptive schemes (e.g., based on traffic workload) that are implemented on small or fine time scales tend to deteriorate the "convergence" and "stability" of the network. The disturbance rejection framework (implemented as a network protocol) described herein ensures stability of the network over optimization of the network in order to maintain required performance metrics in the face of changes. The protocol is implemented to force the performance metrics to quickly converge to set points. In operation, the protocol maximizes performance of a robustly stable network that is able to handle disturbances produced by changing traffic or traffic sources, mobility, and environment changes (e.g., changes of channel gains and/or link capacities).

Figure 1A:
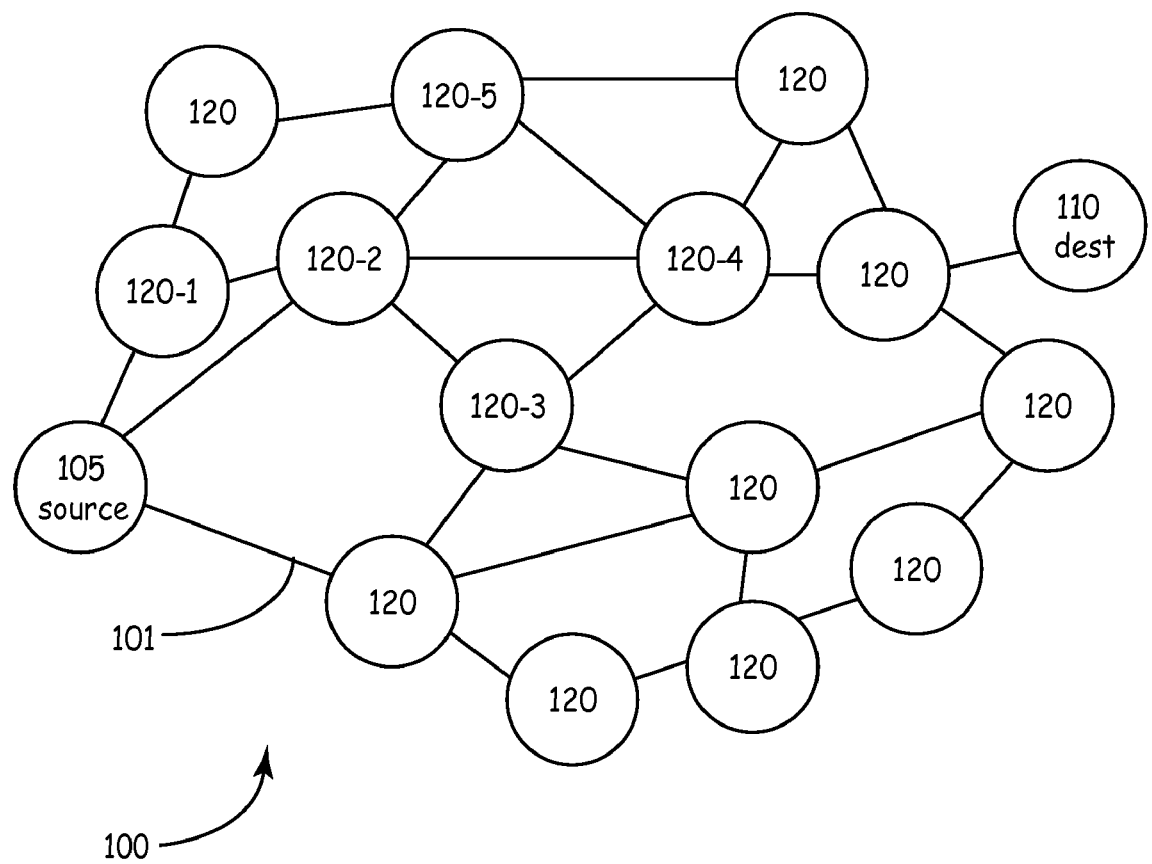
FIG. 1A is a block diagram of one embodiment of a stable wireless network implementing protocol that enables predicable network performance in accordance with the present invention.

FIG. 1A is a block diagram of one embodiment of a stable wireless network 100 implementing a network protocol that enables predicable network performance in accordance with the present invention. This exemplary wireless network 100 includes a plurality of nodes that include a source node 105, a destination node 110, and a plurality of relay nodes 120 and 120(1-5) that are communicatively coupled by wireless communication links represented generally at 101. The relay nodes 120 relay packets between the source node 105 and the destination node 110. The source node 105, the destination node 110, and nodes 120 and 120(1-5) each have one or more neighboring nodes. As defined herein, a "neighboring node" is a node that is linked to a given node by a single wireless communication link 101. Thus, the node 120-2 is a neighboring node to nodes 120-1, 120-3, 120-4, and 120-5. A source node and a destination node for a given packet can function as relay nodes for other packets that are input into the network at another node.

Figure 1B:
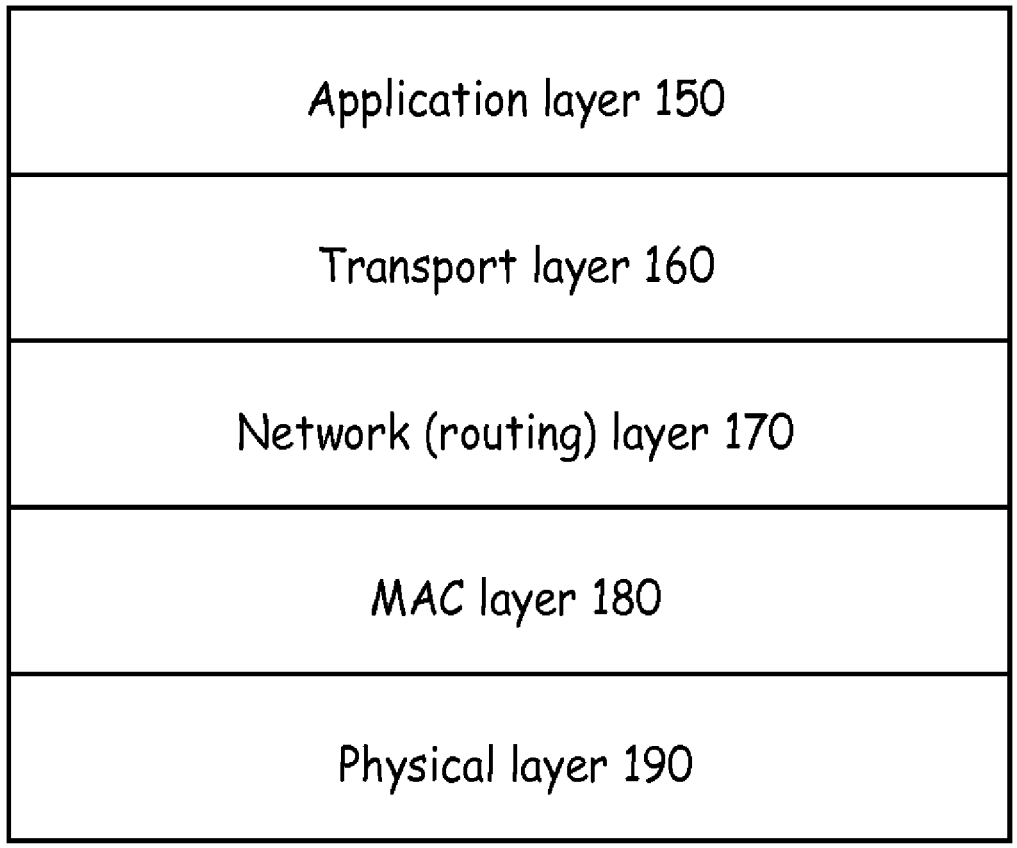
FIG. 1B is a block diagram of one embodiment of a network layer stack in accordance with the present invention.

FIG. 1B is a block diagram of one embodiment of network layer stack 140 in accordance with the present invention. The source node 105, the destination node 110, and nodes 120 and 120(1-5) each include (hierarchically from top to bottom) application layer 150, a transport layer 160, a network layer 170, a media access control (MAC) layer 180, and a physical layer 190. The network layer 170 is the layer that routes packets along one or more paths in the wireless network 100. The application layer 150 is the user-level of the network.

The network protocol is implemented by the networks described herein to stabilize nodes in the network. The network protocol includes an output-distribution-control protocol at the network layer of each node in the network, a distribution-power-control protocol at the media access control layer and physical layer of each node in the network, and a routing protocol at the network layer. The output-distribution-control protocol, the distribution power control protocol, and the routing protocol together function as the network protocol operable to stabilize nodes in the network to a predictable network performance during network disturbances. As defined herein, "network disturbances" include one or more of changes in levels of traffic in one or more communication links in the network, changes in traffic sources, changes in mobility, changes in interference levels between nodes, changes in channel gains, and changes in link capacities.

Figure 2:
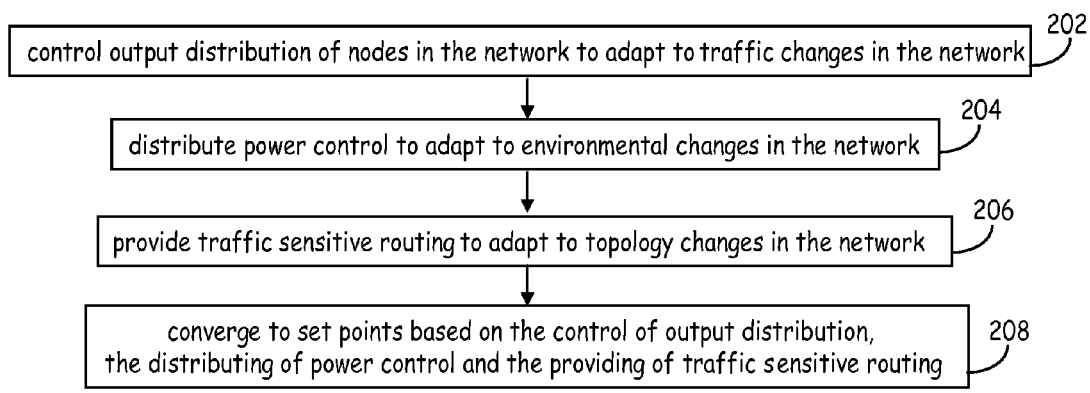
FIG. 2 shows one embodiment of a method to operate a wireless network in accordance with the present invention.

FIG. 2 shows one embodiment of a method 200 to operate a wireless network in accordance with the present invention. Each node includes computer readable medium storing computer-executable instructions, such as software, firmware or other program code for performing the steps of method 200 described herein. At least a portion of the processing of method 200 is performed by software executing on a processor within or communicatively coupled with the node.

At block 202, output distribution of nodes in the network at the network layer is controlled to adapt to traffic changes in the network. For example, the output distribution of relay nodes 120, source node 105, and destination node 110 in the wireless network 100 is controlled at the network layer 170 to adapt to traffic changes in the wireless network 100. The network layer 170 at each node regulates a statistical distribution of the output of that respective node. The method to control the output distribution from each node at the network layer is described in detail below with reference to FIG. 3.

At block 204, power control is distributed at the media access control layer and physical layer to adapt to environmental changes in the network. The method to distribute power control at the media access control layer 180 and physical layer 190 in accordance with the present invention is described in detail below with reference to FIG. 4. The environmental changes in the network include changes in the signal-interference-to-noise ratio (SINR) of one or more of the nodes in the network. For example, when the amplitude of signals at a given frequency or channel is increased in the node 120-3 (FIG. 1), the neighboring node 120-2 (FIG. 1) experiences an increased SINR for signals at that frequency or channel. The neighboring node 120-2 may also experience an increased SINR for signals at harmonic frequencies to the given frequency. In the same manner, the node 120-4 (FIG. 1), which is also a neighboring node to node 120-3, can also experience an increased SINR.

At block 206, traffic sensitive routing is provided at the network layer of the nodes in the network to adapt to topology changes in the network. The method to provide traffic sensitive routing at the network layer of the nodes in the network to adapt to topology changes in the network is described in detail below with reference to FIGS. 5-10. Topology changes in the network include the addition and/or removal of nodes in the network and the resultant addition and/or removal of communication links that communicatively couples to the added/removed nodes.

At block 208, each of the nodes in the network converges to set points based on the control of the output distribution, the distributing of power control, and the providing of traffic sensitive routing. Adaptation to changes in the topology layers is at the network layer while adaptation to environmental changes occurs at the physical layer and the media access control layer.

Figure 3:
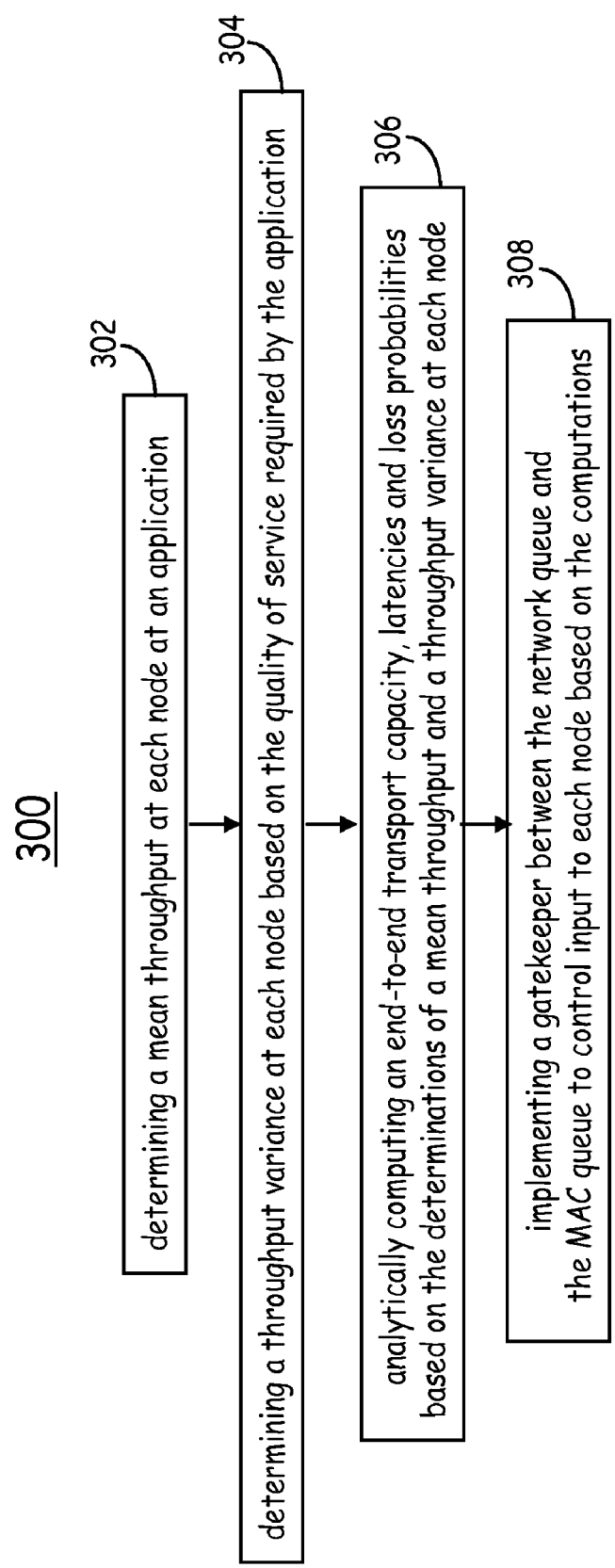
FIG. 3 shows one embodiment of a method to control output distribution of nodes in accordance with the present invention.

FIG. 3 shows one embodiment of a method 300 to control output distribution of nodes in accordance with the present invention. The control of output distribution occurs at the network layer. Each node includes computer readable medium storing computer-executable instructions, such as software, firmware or other program code for performing the steps of method 300 described herein. At least a portion of the processing of method 300 is performed by software executing on a processor within or communicatively coupled with the node.

At block 302, a mean throughput is determined at each node for an application.

At block 304, a throughput variance is determined at each node based on the quality of service required by the application. The determination of the mean throughput at block 312 and throughput variance at block 304 is based on the traffic requirements of each application, and is also based on optimizing the network to accommodate all the traffic requirements. Every node, whether a source node, a destination node, or a relay node, seeks to regulate the statistical distribution of throughput it produces at its output. The mean throughput and its throughput variance is determined by the quality of service (QoS) by the set applications and the data rates needed to satisfy their traffic requirements. Along different paths between a source node and a destination node, the required mean throughput and throughput variance can differ. Where the paths intersect, or overlap, the mean throughput set point and throughput variance set point or the output distributions is determined by the sums of overlapping traffic distributions.

The governing equations for observing mean throughput and throughput variance of throughput are:

$$\mu_{k+1} = (\lambda - \alpha)\mu_k + \alpha \lambda_k \tag{1}$$

and $$\sigma_{k+1}^2 = (1 - 2\alpha)\sigma_k^2 + \alpha(\lambda_k - \mu_k)^2 \tag{2}$$

where $\mu_k$ is the mean throughput and $\sigma_k$ is the standard deviation and $\lambda_k$ is the throughput in time interval k. The control input to drive the mean throughput to $\mu$ and the standard deviation to $\sigma$ is:

$$\lambda_k = \frac{\left(\alpha - \frac{\sigma}{\sigma_k}\right)\mu_k}{\alpha + \alpha - \frac{\sigma}{\sigma_k}}(\mu_k + \mu) + \mu \tag{3}$$

This control law (equation 3) is distributed and stable.

At block 306, an end-to-end transport capacity, latencies, and loss probabilities are analytically computed based on the determinations of the mean throughput and throughput variance at each node.

At block 308, a gatekeeper is implemented between the network queue and the media access control queue to control input to each node based on the computations. The mean throughput at each node and the throughput variance at each node are driven to a selected mean throughput and a selected throughput variance, respectively. The gatekeeper between the network queue and the MAC queue regulates the number of frames that enter the MAC queue in a given ($k^{th}$) time interval. This control is used only when there are bandwidth shortages (several nodes communicating in a neighborhood on the same channel). Once the statistical distribution of the output of each node is regulated, then the end-to-end transport capacity, latencies, and loss probabilities are analytically computed as described by Srivatsan Varadarajan, Yunjung Yi, and Kartik Ariyur in "Analytic Framework and QoS Adaptive Mechanisms for Achieving Transport Capacity Bounds in Multi-hop Statically Routed IEEE 802.11b Networks," First Annual Conference of ITA (ACITA) 2007, which is incorporated herein by reference.

Figure 4:
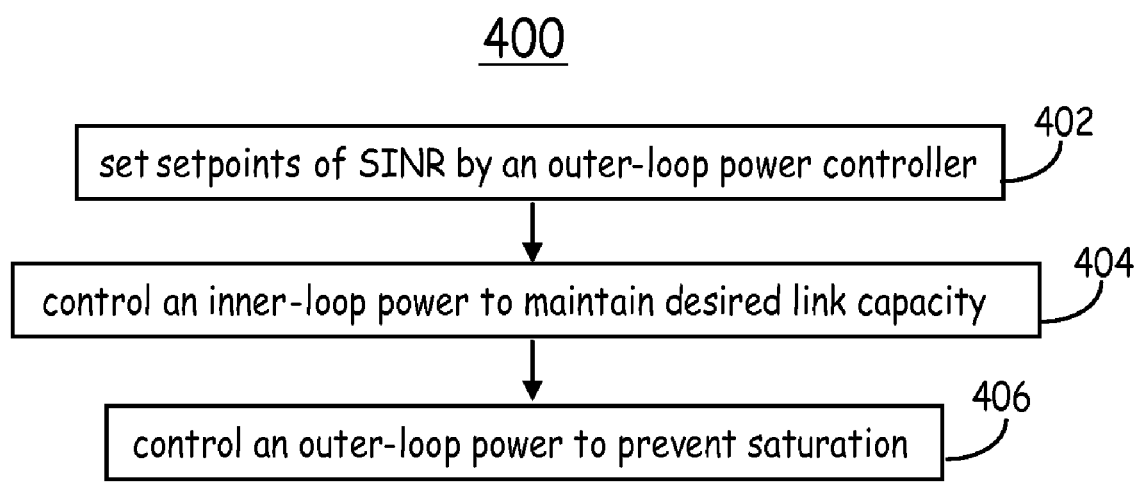
FIG. 4 shows one embodiment of a method to distribute power control in accordance with the present invention.

FIG. 4 shows one embodiment of a method 400 to distribute power control in accordance with the present invention. The power is distributed at the media access control layer and physical layer. The power control is adjusted responsive to environmental changes. At block 402, setpoints of SINR are set by an outer-loop power controller to avoid saturation of the receiver in each node. Specifically, the set points are set by the outer loop power control at the media access control layer to ensure receivers in the nodes are not saturated. To assure uniform degradation of quality of service (QoS), the set points of SINR at each node are proportional to the rate of information generation (appropriately defined) at the respective node. At block 404, an inner-loop power is controlled to maintain desired link capacity. The inner loop power control maintains the desired link capacity at the physical layer.

At block 406, an outer-loop power is controlled to prevent saturation of a front end of a receiver at the node. The outer-loop power control and the inner-loop power control are distributed through single hop feedback (i.e., to neighboring nodes) of SINR and total received power. As defined herein, the power control is stable when the received SINR of each transmitter in each node has converged to the SINR set point. The distributed inner loop power control between transmitter i and receiver j is:

$$P_{k+1}^{ij} = \frac{SINR^{ij}}{SINR_k^{ij}} P_k^{ij} \tag{4}$$

The distributed outer loop power control between the transmitter i and the receiver j is:

$$SINR^{ij} = SINR^{ij} + \alpha(P_{sat}^j - P^j) \tag{5}$$

$$\alpha = \frac{I^i - \bar{I}}{\sigma} \tag{6}$$

$I^i$ is the intensity of the output signal from the $i^{th}$ node. $\bar{I}$ is the average intensity of all the nodes in the network. $P_{sat}^j$ is the saturated power level for the $j^{th}$ node. The increases or decreases of the SINR set point depend upon the saturation power of the receiver and the information that a given node 120-$i$ is sending out compared to other modes in the wireless network 100. The setpoints of SINR at each node are proportional to the rate of information generation at the respective node.

The state information is implemented in each node to manage mobility at the media access control layer. The mobility is managed by controlled flooding or robust group forwarding as described below with reference to FIG. 5.

Figure 5:
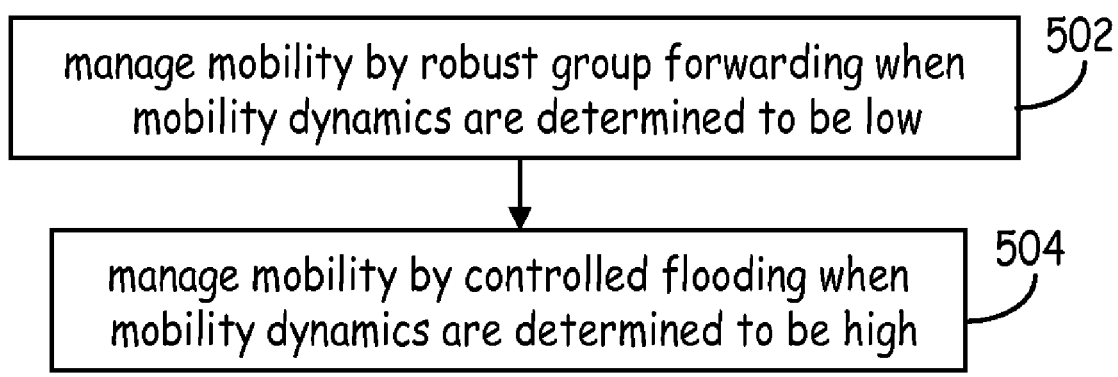
FIG. 5 shows one embodiment of a method to provide traffic sensitive routing in accordance with the present invention.

FIG. 5 shows one embodiment of a method 500 to provide traffic sensitive routing in accordance with the present invention. The traffic sensitive routing occurs at the network layer. Each node includes computer readable medium storing computer-executable instructions, such as software, firmware or other program code for performing the steps of method 500 described herein. At least a portion of the processing of method 500 is performed by software executing on a processor within or communicatively coupled with the node.

At block 502, mobility is managed by robust group forwarding when mobility dynamics are determined to be low. The method of managing mobility by robust group forwarding is described below with reference to FIG. 6. At block 504, mobility is managed by controlled flooding when mobility dynamics are determined to be high. Mobility management is used to adapt to topology changes in the network. The method of managing mobility by controlled flooding is described below with reference to FIG. 8. The method of managing mobility by robust group forwarding and by controlled flooding occurs at the network layer.

As the network evolves, information indicative of the spare capacities of the network communication links is stored with the basic topological information about the communication links, such as communication links 101 (FIG. 1). Packets are forwarded through the paths that have spare capacities closest to the demands of the message during route selection. In this manner, the path capacity used by a packet is minimized by using the spare capacities along the path. Application admission decisions are made based on available path capacity and traffic requirement. This is possible because the throughput distributions at the outputs of nodes converge quickly to their set points. Routing traffic always has priority over other traffic. The skewing of the throughput distribution caused by the routing traffic is compensated through slowing other traffic.

Figure 6:
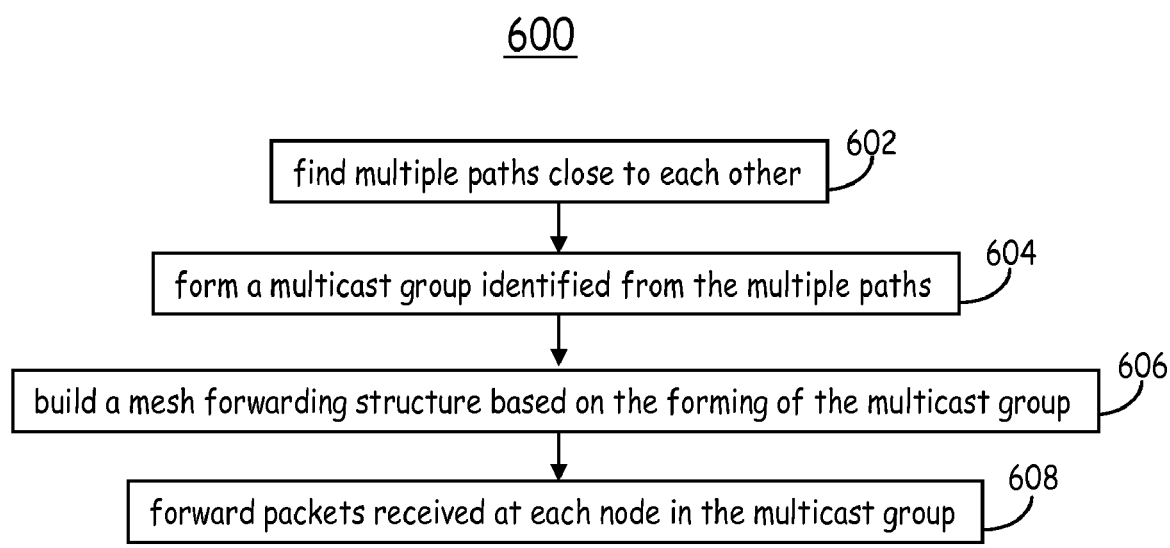
FIG. 6 shows one embodiment of a method to manage mobility by robust group forwarding in accordance with the present invention.

The two methods of managing mobility by robust group forwarding and controlled flooding, are now described in detail. FIG. 6 shows one embodiment of a method 600 to manage mobility by robust group forwarding in accordance with the present invention. Each node includes computer readable medium storing computer-executable instructions, such as software, firmware or other program code for performing the steps of method 600 described herein. At least a portion of the processing of method 600 is performed by software executing on a processor within or communicatively coupled with the node.

During robust group forwarding, a multi-path routing structure is established in the network for a source/destination pair. As described above with reference to block 502 in FIG. 5, the method 600 to manage mobility by robust group forwarding is implemented when the mobility dynamics are low, i.e., when the topology of the network is not changing often. The determination about the level of the rate of change of the network is made at the network layers of the nodes in the network.

Figure 7:
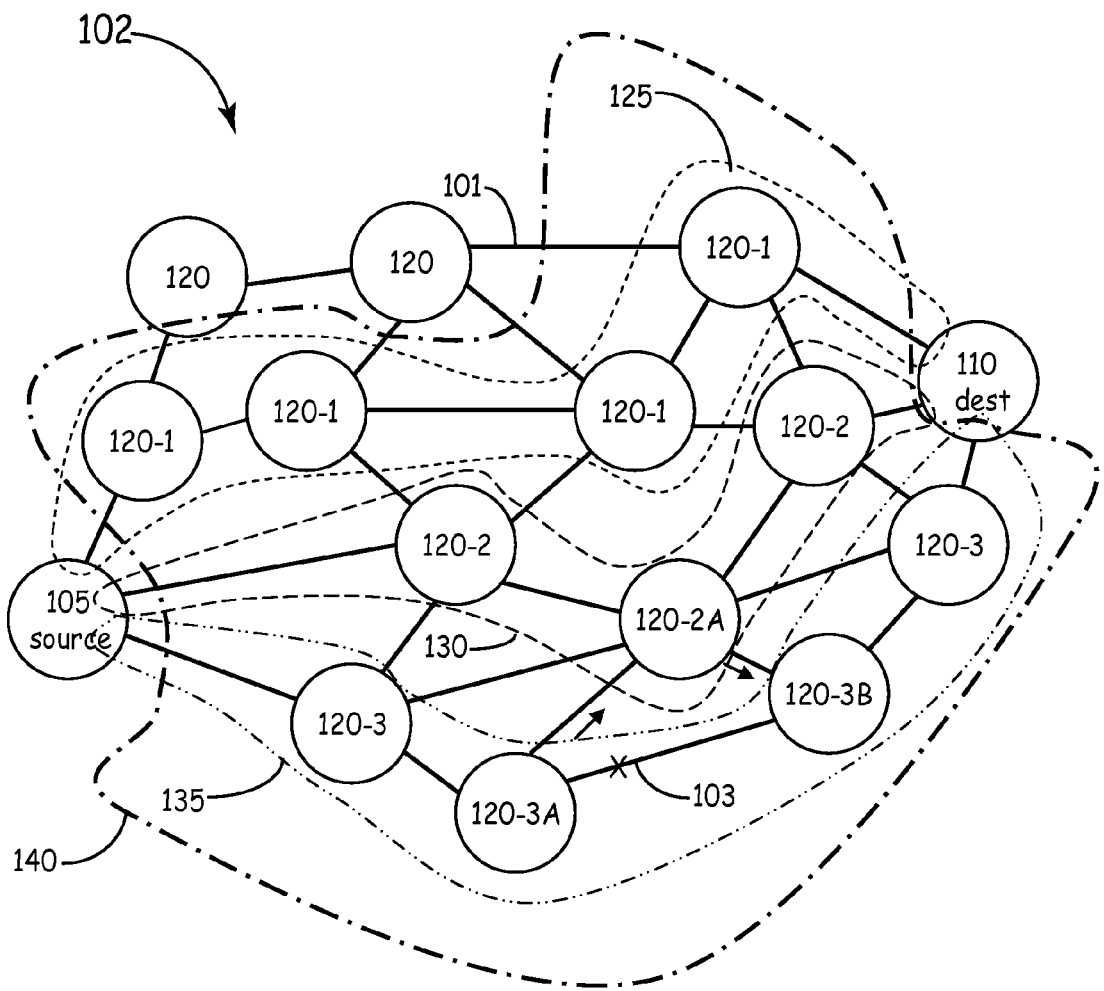
FIG. 7 is a block diagram showing one embodiment of multiple paths in a network that implements a protocol that enables predicable network performance in accordance with the present invention.

FIG. 7 is a block diagram showing one embodiment of multiple paths 125, 130, and 135 in a network 102 that implements a protocol that enables predicable network performance in accordance with the present invention. Method 600 is described with reference to network 102 of FIG. 7, although the method 600 is applicable to other embodiments of networks.

At block 602 and as shown in FIG. 7, multiple paths 125, 130, and 135 that are close to each other are identified by a source/destination pair 105-110. The source node 105 and the destination node 110 form the source/destination pair 105-110. The identification of the multiple paths 125, 130, and 135 occurs at the network layer 170 (FIG. 1B) of the source node 105 and the destination node 110. In the exemplary embodiment shown in FIG. 7, the first path represented generally at 125 includes the four relay nodes 120-1, the second path represented generally at 130 includes the three relay nodes 120-2, and the third path represented generally at 135 includes the four relay nodes 120-3. In one implementation of this embodiment, a first path and a second path are close to each other, when the nodes in the first path are neighboring nodes with the nodes in the second path, and/or when the nodes in the first path are neighboring nodes of the neighboring nodes in the second path. In another implementation of this embodiment, a first path and a second path are close to each other, when the nodes in the first path are neighboring nodes with the nodes in the second path.

At block 604, a multicast group represented generally at 140 is formed from the multiple paths 125, 130, and 135. The multicast group comprises the relay nodes within the multiple paths 125, 130, and 135. At block 606, a mesh forwarding structure is built based on the forming of the multicast group. The mesh forwarding structure comprises the communication links, such as wireless communication link 101 (FIG. 1), interconnecting the nodes 120 in the multicast group 140. The multicast group 140 builds the mesh forwarding structure.

At block 608, packets received at each node 120(1-3) in the multicast group 140 are forwarded. Upon receiving a new packet, each node 120(1-3) in the multicast group 140 forwards the packet with a probability in order to guarantee required bandwidth for the network 102. A few link failures can be handled by the mesh structure in the multicast group 140. For example, if the communication link represented generally at 103 is broken (as indicated by an "X" overlaying the communication link 103). The broken communication link 103 breaks the direct communicative coupling between the node 120-3A and the neighboring node 120-3B. The mesh structure in the multicast group 140 permits the node 120-3A to send received packets to 120-3B via the neighboring node 120-2A (as indicated by the arrow between the nodes 120-3A and 120-2A and by the arrow between the nodes 120-2A and 120-2B).

Figure 8:
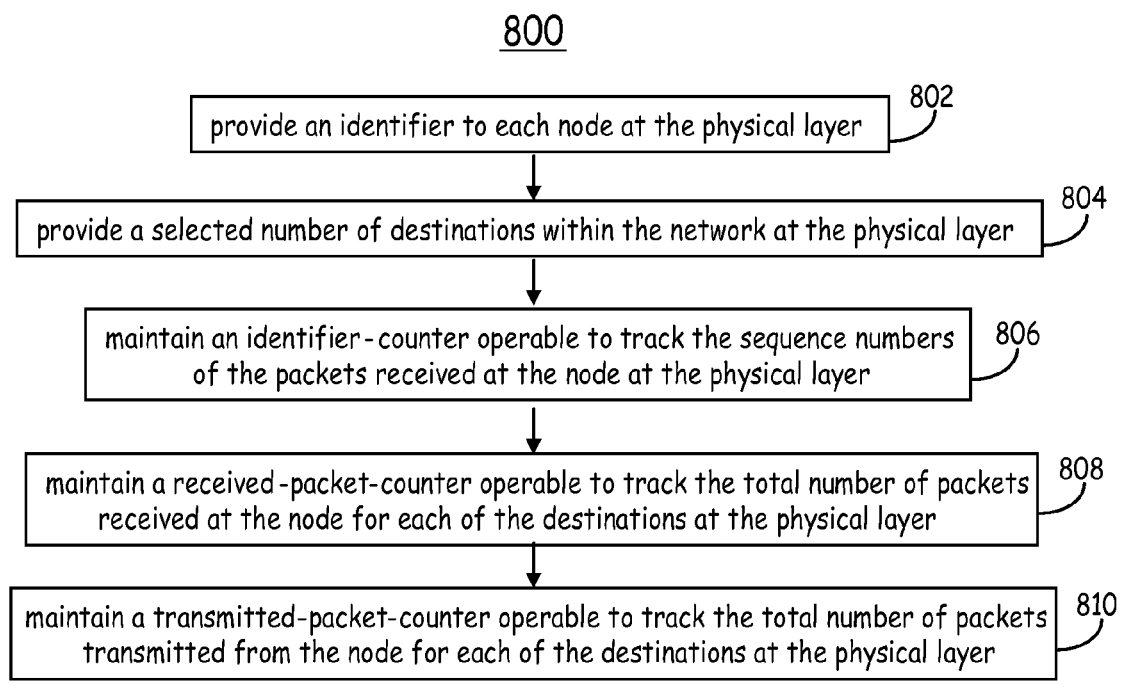
FIG. 8 shows one embodiment of a method to manage mobility by controlled flooding in accordance with the present invention.
Figure 9:
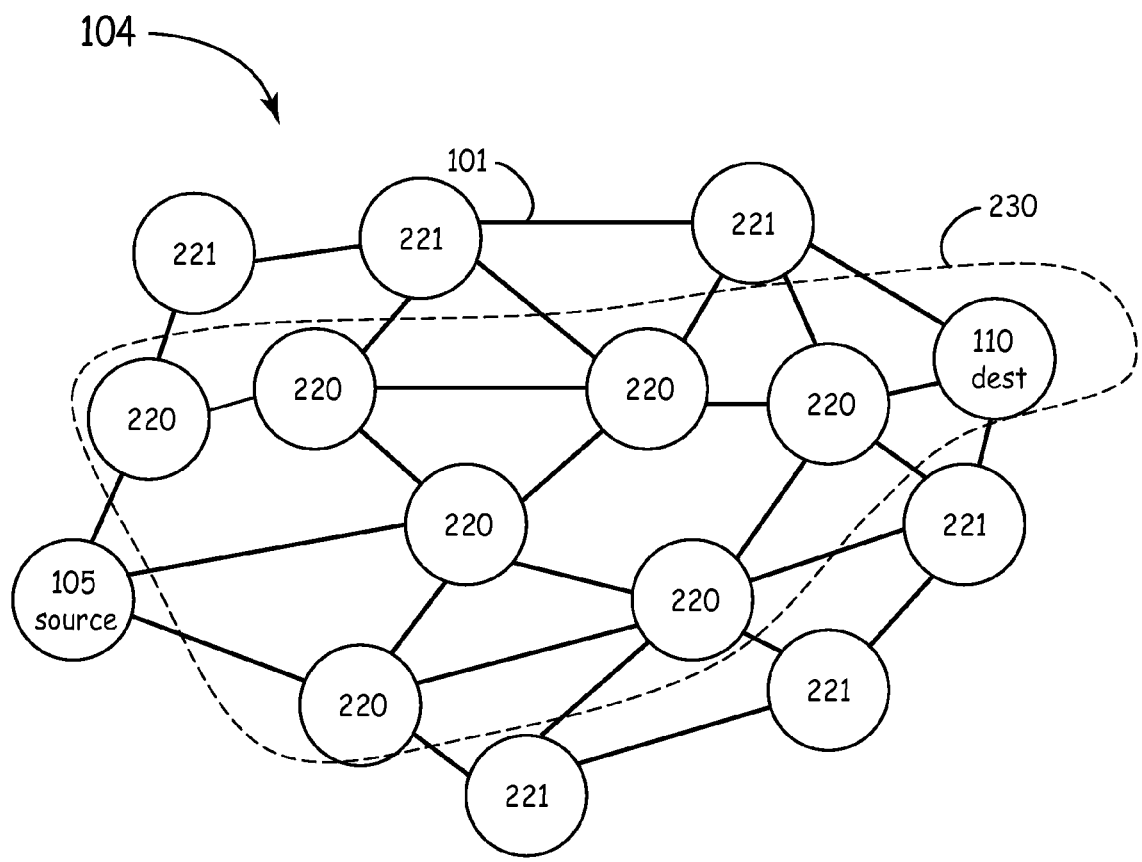
FIG. 9 is a block diagram of one embodiment of a network implementing a controlled flooding protocol in accordance with the present invention.

FIG. 8 shows one embodiment of a method 800 to manage mobility by controlled flooding in accordance with the present invention. FIG. 9 is a block diagram of one embodiment of a network 104 implementing a controlled flooding protocol in accordance with the present invention. Each node includes computer readable medium storing computer-executable instructions, such as software, firmware or other program code for performing the steps of method 800 described herein. At least a portion of the processing of method 800 is performed by software executing on a processor within or communicatively coupled with the node. Method 800 is described with reference to network 104 of FIG. 9, although the method 800 is applicable to other embodiments of networks.

As described above with reference to block 504 in FIG. 5, the method 800 to manage mobility by controlled flooding is implemented when the mobility dynamics are high, i.e., when the topology of the network is often changing. If the number of nodes and/or the configurations of the communication links in the network are changing rapidly, the controlled flooding technique is used to simultaneously discover routes and forward packets. The overhead on the exchanged packets is reduced and the packets are forwarded to neighboring nodes. The overhead for the packets is reduced since the state information for the whole route is not in the overhead of the packet. Applications are admitted to the network during the controlled flooding phase of operation for a source/destination pair if there is available stable transport bandwidth between the source node and the destination node to support the given application requirements. For example, applications are admitted to the network 104 during the controlled flooding phase of operation for a source/destination pair 105/110 if there is available stable transport bandwidth between the source node 105 and the destination node 110 to support the given application requirements.

At block 802, each node is provided with an identifier at the physical layer. In one implementation of this embodiment, each node is given an identifier when the node is incorporated into the network by the establishment of a communication link with at least one of the nodes that is already in the network. At block 804, a selected number of destinations within the network are provided at the physical layer. At block 806, an identifier-counter operable to track the sequence numbers of the packets received at the node is maintained at the physical layer. At block 808, a received-packet-counter operable to track the total number of packets received at the node is maintained for each of the destinations at the physical layer. At block 810, a transmitted-packet-counter operable to track the total number of packets transmitted from the node is maintained for each of the destinations at the physical layer.

The state information in each node (e.g., information about the power levels, the buffer-dampening factor α, and the destination-likelihood increasing factor β) is used to manage mobility by controlled flooding at a media access control layer. The ripple effect of the flooding is controlled through the buffer-dampening factor α, which controls how much a given node has relayed to each of neighboring nodes as flooding propagates from the source node. As shown in FIG. 9, a likely-destination boundary represented generally at 230 includes the relay nodes 220 and the destination node 110 that all have a higher probability of being the destination for a given packet. A destination-likelihood increasing factor β sets the nodes 220 inside the likely-destination boundary 230 with a higher probability of being the destination for a given packet. A buffer-dampening factor α sets the nodes 221 outside the likely-destination boundary 230 with a lower probability of being the destination for a given packet.

The controlled flooding accentuates the propagation of the packets towards the nodes 220, which have a higher probability of reaching the destination node 110, and discourages the propagation of the packets towards the nodes 221 outside the likely-destination boundary 230. The controlled flooding generates multiple-paths that include over-lapping paths and non-overlapping paths. The over-lapping paths lower the probability of losing a path because of mobility of one or more of the relay nodes 220 and 221.

This control flooding requires the maintenance of state information in every node of the network. Each node has a unique identifier that is an integer from "1" to "n". The algorithm to control the flooding sets "k" nodes as the only allowed destinations, where k<n. Any of the nodes (such as nodes 220 and 221) can send traffic to one of the "k" destinations for each unicast flow. A unicast flow has one source node (such as source node 105) and one destination node (such as destination node 110) per packet. Each unicast flow is a determined by the source/destination pair (such as source/destination pair 105/110), where the source is one of the n nodes and the destination is one of the k destinations. Without loss of generality, the first k nodes (numbered 1, 2, 3, ..., k) are set as the destination nodes 110 (only one of which is shown in FIG. 9). Every source node 105 (only one of which is shown in FIG. 9) has a unique identifier for each packet that it relays and for each of the packets it initiates in a flow. Every packet has three pieces of information in its header: (source, destination, iden) where (source, destination) is the flow and "iden" is the unique packet sequence number transmitted by the "source." Thus, network wide, there is always a unique (source, iden) which represents a packet.

Every node "u" maintains three types of counters: a "sequence number for a group of units"/set (represented generally by numeral as SN group/sets) counter, a $C_R$ counter, and a $C_T$ counter. The SN group/sets counter has a size "n." The $C_R$ counter has a size "k." The $C_T$ counter has a size "k."

The SN group/sets counter at the "$u^{th}$" node keeps track of the sequence number (iden's) of the packets received at the "$u^{th}$" node from each of the n different sources. This SN group/sets tracking is mathematically represented as: SNu [1], SNu [2] ..., and SNu [n]. The $C_R$ counter at the "$u^{th}$" node keeps track of total number of packets received at the "$u^{th}$" node for each of k destinations. This $C_R$ tracking is mathematically represented as: $Cu_R$ [1], $Cu_R$ [2] ... $Cu_{R\,[k]}$. $C_T$ counter at the "$u^{th}$" node keeps track of total number of packets transmitted from at the "$u^{th}$" node for each of k destinations. This $C_T$ tracking is mathematically represented as: $CU_T$ [1], $Cu_T$ [2] ... $Cu_T$ [k]. All counters are suitably initialized. By definition, $C_R \geq C_T$ is always true.

The process by which the controlled flooding is managed is now described. A node u within the 1 to n nodes receives a "broadcast" packet (source, destination, iden). The node u knows counter values for all its neighboring nodes. If the $v^{th}$ node is an immediate neighbor of the $u^{th}$ node, then the values: $\{Cv_R [1], Cv_R [2], \ldots, Cv_R [k]\}$ and $\{Cv_T [1], Cv_T [2], \ldots, Cv_T [k]\}$ are stored in the $u^{th}$. This counter information about the neighboring node is exchanged during the neighbor periodic "hello/keep alive" messages that are sent between neighboring nodes. During the controlled flooding process a processor in the $u^{th}$ node makes at least one logical decision step for each received packet at every node. The first logical decision step determines if "iden" is already found in the SN group/sets counter as SNu [source]. If "iden" is already found in the SN group/sets counter, the received packet is a duplicate packet and the received packet is discarded. This completes the process for that packet.

If "iden" is not already found in the SN group/sets counter SNu [source], "iden" is inserted into the SN group/sets counter SNu [source] and $Cv_R$ [destination] is incremented by one (1).

The second logical decision step determines if "u" is the destination. If "u" is the destination, $Cu_T$ [destination] is incremented by one (1) and the packet is sent to the upper layers of the network protocol stack. This completes the process for that packet.

If "u" is not the destination for the received packet, the node is either a transmitter for the packet or a relay node for the packet. In either of these cases, the currently received packet is inserted into the holding queue which holds all packets to a given destination. The node examines the locally stored counter value information for all neighboring nodes "v." At this point the buffer-dampening factor α and the destination-likelihood increasing factor β described above are implemented.

The $u^{th}$ node searches for the $v^{th}$ node for which the following conditions are both satisfied:

$$[C_R^v(dest) - C_T^v(dest)] + \alpha \leq [C_R^u(dest) - C_T^u(dest)] \quad (7)$$

and $$\frac{C_T^v(dest)}{C_R^v(dest)} + \beta \geq \frac{C_T^u(dest)}{C_R^u(dest)} \quad (8)$$

The buffer-dampening factor αx and the destination-likelihood increasing factor β are preselected values used to control the flooding. They are both greater than zero (0).

If the $u^{th}$ node finds a neighboring $v^{th}$ node that satisfies equations 7 and 8, then the current packet at the head of the holding queue is broadcasted and relayed and the process for that packet ends. Then $Cu_T$ [destination] is incremented by one (1). If no such neighboring $v^{th}$ node exists, the process for that packet ends. In this case, the current packet is held in the buffer/queue for subsequent relay in the future.

Figure 10:
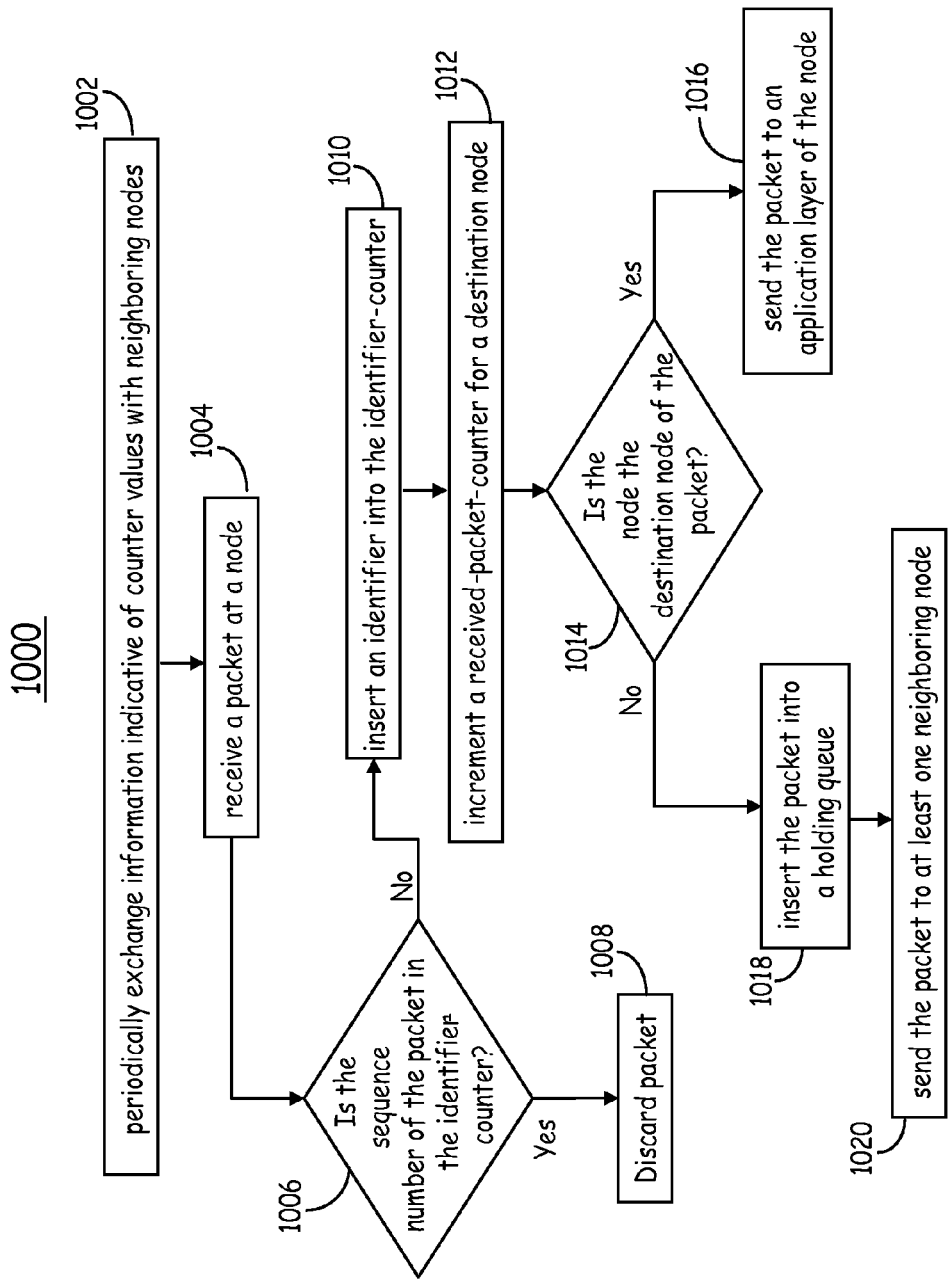
FIG. 10 shows one embodiment of a method to implement the state information in each node to manage mobility by controlled flooding in accordance with the present invention.

This maintenance of state information in every node of the network is summarized in the flow diagram of FIG. 10. FIG. 10 shows one embodiment of a method 1000 to implement the state information in each node to manage mobility by controlled flooding in accordance with the present invention. Each node includes computer readable medium storing computer-executable instructions, such as software, firmware or other program code for performing the steps of method 1000 described herein. At least a portion of the processing of method 1000 is performed by software executing on a processor within or communicatively coupled with the node.

At block 1002, information indicative of counter values is periodically exchanged with neighboring nodes. The information indicative of counter values is exchanged via the physical layer. At block 1004, a packet is received at the node from a neighboring node in the network. At block 1006, it is determined if the sequence number of the packet received at the node is a sequence number in the identifier-counter. At block 1008, the packet is discarded if the sequence number of the packet received at the node is a sequence number in the identifier-counter. At block 1010, if the sequence number of the packet received at the node is not a sequence number in the identifier-counter, an identifier is inserted into the identifier-counter. At block 1012, the received-packet-counter is incremented for a destination node responsive to inserting the identifier into the identifier-counter.

At block 1014, it is determined if the node is the destination node of the packet. At block 1016, the packet is sent to an application layer (e.g., application layer 150 shown in FIG. 1B) of the node if the node is the destination node of the packet. The packet is sent to the application layer through all of the upper layers of the network layer stack 140 (FIG. 1B) that are above the physical layer of the network layer stack. At block 1018, the packet is inserted into a holding queue for the destination, if the node is not the destination node. At block 1020, the packet is sent to a neighboring node responsive to inserting the packet into a holding queue at block 1018. In one implementation of this embodiment, the neighboring node to which the packet is sent is the next node in the path between the node and the destination node. In another implementation of this embodiment, the neighboring node to which the packet is sent is two or more neighboring nodes that are in paths between the node and the destination node.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for operating a wireless network having a predictable and stable network performance, the method comprising:
   controlling, by at least one of processor and controller, output distribution of network nodes in the network at a layer 3 of the network protocol stack of each of the respective network nodes to adapt to traffic changes in the network by:
   determining a mean throughput at each network node for an application; determining a throughput variance at each network node based on a quality of service required by the application;
   analytically computing an end-to-end transport capacity, latencies, and loss probabilities based on the determinations of the mean throughput and the throughput variance at each network node;
   and implementing a gatekeeper between a network queue and a media access control queue to control input to each network node based on the computations, wherein the mean throughput at each network node and the throughput variance at each network node are driven to a selected mean throughput and a selected throughput variance.
   distributing power control to adapt to environmental changes in the network at a layer 1 and a layer 2 of the network protocol stack of each of the respective network nodes;
   providing traffic sensitive routing to adapt to topology changes in the network at the layer 3 of the network protocol stack of each of the respective network nodes;
   and converging to set points based on the controlling output distribution, the distributing of power control and the providing of traffic sensitive routing.

2. The method of claim 1, wherein distributing power control comprises:
   setting set points of signal-interference-to-noise ratio by an outer-loop power controller to avoid saturation in the network nodes;
   controlling an inner-loop power to maintain desired link capacity; and
   controlling an outer-loop power to prevent saturation.

3. The method of claim 2, wherein the set points of signal-interference-to-noise ratio at each network node are proportional to the rate of information generation at each of the respective network nodes.

4. The method of claim 1, further comprising:
   implementing state information in each network node to manage mobility by controlled flooding.

5. The method of claim 4, wherein implementing the state information in each network node to manage mobility by controlled flooding comprises:
   periodically exchanging information indicative of counter values with neighboring nodes;
   receiving a packet at a network node;
   discarding the packet if a sequence number of the packet received at the network node is a sequence number in an identifier-counter;
   inserting an identifier into the identifier-counter if the sequence number of the packet received at the network node is not a sequence number in the identifier-counter;
   incrementing a received-packet-counter for a destination node responsive to inserting the identifier into the identifier-counter;
   sending the packet to an application layer of the network node if the network node is the destination node;
   inserting the packet into a holding queue if the network node is not the destination node; and
   sending the packet to at least one neighboring network node responsive to inserting the packet into the holding queue.

6. The method of claim 1, wherein providing traffic sensitive routing comprises:
   managing mobility by robust group forwarding when mobility dynamics are determined to be low; and
   managing mobility by controlled flooding when mobility dynamics are determined to be high, wherein managing mobility is used to adapt to topology changes in the network.

7. The method of claim 6, wherein managing mobility by robust group forwarding comprises:
   establishing a multi-path routing structure by,
   finding multiple paths close to each other;
   forming a multicast group from the multiple paths;
   building a mesh forwarding structure based on the forming of the multicast group; and
   forwarding packets received at each network node in the multicast group.

8. The method of claim 6, wherein managing mobility by controlled flooding comprises:

simultaneously discovering multiple paths through the network and sending packets on the multiple paths; and limiting exchange of information with neighboring network nodes to maintain the information exchange at a low level.

9. The method of claim 6, wherein managing mobility by controlled flooding comprises:

providing an identifier to each network node at the layer 1;

providing a selected number of destinations within the network at the layer 1;

maintaining an identifier-counter operable to track sequence numbers of packets received at each of the network nodes at the layer 1;

maintaining a received-packet-counter operable to track a total number of packets received at each of the network nodes for each of the destinations at the layer 1; and maintaining a transmitted-packet-counter operable to track a total number of packets transmitted from each of the network nodes for each of the destinations at the layer 1.

10. A wireless network comprising: a plurality of nodes; an output distribution control protocol at a network layer of the network protocol stack of each of the plurality of nodes for adapting to traffic changes in the network, wherein the output distribution control protocol is operable to determine a mean throughput at each network node for an application and to determine a throughput variance at each network node based on a quality of service required by the application, and wherein at least one of a processor and a controller analytically compute an end-to-end transport capacity, latencies, and loss probabilities based on the determinations of the mean throughput and the throughput variance at each network node;

and implement gatekeeper between a network queue and a media access control queue to control input to each network node based on the computations, wherein the mean throughput at each network node and the throughput variance at each network node are driven to a selected mean throughput and a selected throughput variance;

a distributed power control protocol at a media access control layer and a physical layer of the network protocol stack of each of the plurality of nodes for adapting to environmental changes in the network; and a traffic sensitive routing protocol at the network layer of the network protocol stack of each of the plurality of nodes for adapting to topology changes in the network; wherein the output distribution control protocol, the distribution power control protocol, and the routing protocol together function to stabilize each of the plurality of nodes in the network to a predictable network performance during network disturbances.

11. The wireless network of claim 10, wherein network disturbances include one or more of changes in levels of traffic, changes in traffic sources, changes in mobility, changes in interference levels between nodes, changes in channel gains, and changes in link capacities.

12. The wireless network of claim 10, wherein the distributed power control protocol is operable to set points of signal-interference-to-noise ratio by an outer-loop power controller at the media access control layer, to control an inner-loop power at the physical layer, and to control an outer-loop power to prevent saturation.

13. The wireless network of claim 10, wherein the traffic sensitive routing protocol is operable to manage mobility by robust group forwarding when mobility dynamics are determined to be low at the network layer, and to manage mobility by controlled flooding when mobility dynamics are determined to be high at the network layer.

14. A non-transitory computer readable medium having instructions stored thereon for implementing a method for operating a wireless network having a predictable and stable network performance, the instructions comprising:

computer readable code for controlling output distribution of network nodes in the network at a layer 3 of the network protocol stack of each of the respective network nodes to adapt to traffic changes in the network, wherein the computer readable code for controlling output distribution of nodes in the network comprises computer readable code for:

determining a mean throughput at each network node for an application;

determining a throughput variance at each network node based on the quality of service required by the application;

analytically computing an end-to-end transport capacity, latencies, and loss probabilities based on the determinations of the mean throughput and the throughput variance at each network node; and implementing a gatekeeper between a network queue and a media access control queue to control input to each network node based on the computations, wherein the mean throughput at each network node and the throughput variance at each network node are driven to a selected mean throughput and a selected throughput variance;

computer readable code for distributing power control to adapt to environmental changes in the network at a layer 1 and a layer 2 of the network protocol stack of each of the respective network nodes;

computer readable code for providing traffic sensitive routing to adapt to topology changes in the network at the layer 3 of the network protocol stack of each of the respective network nodes; and computer readable code for converging to set points based on the controlling output distribution, the distributing of power control and the providing of traffic sensitive routing.

15. The non-transitory computer readable medium of claim 14, wherein the computer readable code for distributing power control comprises:

computer readable code for setting set points of signal-interference-to-noise ratio by an outer-loop power controller to avoid saturation in the network nodes;

computer readable code for controlling an inner-loop power to maintain desired link capacity; and computer readable code for controlling an outer-loop power to prevent saturation.

16. The non-transitory computer readable medium of claim 14, wherein the computer readable code for providing traffic sensitive routing comprises:

computer readable code for managing mobility by robust group forwarding when mobility dynamics are determined to be low; and computer readable code for managing mobility by controlled flooding when mobility dynamics are determined to be high, wherein managing mobility is used to adapt to topology changes in the network.

* * * * *

UNITED STATES PATENT AND TRADEMARK OFFICE
CERTIFICATE OF CORRECTION

PATENT NO. : 8,107,387 B2  
APPLICATION NO. : 12/054819  
DATED : January 31, 2012  
INVENTOR(S) : Ariyur et al.

Page 1 of 1

It is certified that error appears in the above-identified patent and that said Letters Patent is hereby corrected as shown below:

At Claim 1, Column 11, Line 67, replace "variance." with --variance;--

At Claim 10, Column 13, Line 26, replace "variance at each network node" with --variance at each node--

At Claim 10, Column 13, Line 31 and 32, replace "variance at each network node" with --variance at each node--

At Claim 10, Column 13, Line 35, replace "network node based on the computations," with --node based on the computations,--

At Claim 10, Column 13, Line 36, replace "variance at each network node" with --variance at each node--

At Claim 10, Column 13, Line 37, replace "variance at each network node" with --variance at each node--

Signed and Sealed this  
Twenty-ninth Day of May, 2012

David J. Kappos  
*Director of the United States Patent and Trademark Office*